(12) United States Patent
Grimm et al.

(10) Patent No.: US 10,115,016 B2
(45) Date of Patent: Oct. 30, 2018

(54) SYSTEM AND METHOD TO IDENTIFY A VEHICLE AND GENERATE RESERVATION

(71) Applicants: GM GLOBAL TECHNOLOGY OPERATIONS LLC, Detroit, MI (US); GENERAL MOTORS LLC, Detroit, MI (US)

(72) Inventors: Donald K. Grimm, Utica, MI (US); Christopher L. Oesterling, Troy, MI (US); Amy E. Hurley, Royal Oak, MI (US); Aditya S. Kamini, Bloomfield Hills, MI (US)

( * ) Notice: Subject to any disclaimer, the term of this patent is extended or adjusted under 35 U.S.C. 154(b) by 107 days.

(21) Appl. No.: 15/399,252

(22) Filed: Jan. 5, 2017

(65) Prior Publication Data
US 2018/0189566 A1 Jul. 5, 2018

(51) Int. Cl.
| | |
|---|---|
| G06K 9/00 | (2006.01) |
| G06K 9/32 | (2006.01) |
| G06K 9/46 | (2006.01) |
| G06K 9/62 | (2006.01) |
| G06Q 10/02 | (2012.01) |
| H04N 5/232 | (2006.01) |

(52) U.S. Cl.
CPC ....... *G06K 9/00671* (2013.01); *G06K 9/3258* (2013.01); *G06K 9/4614* (2013.01); *G06K 9/6257* (2013.01); *H04N 5/23296* (2013.01); *G06K 2209/15* (2013.01); *G06Q 10/02* (2013.01)

(58) Field of Classification Search
None
See application file for complete search history.

(56) References Cited

U.S. PATENT DOCUMENTS

| | | |
|---|---|---|
| 5,131,053 A | 7/1992 | Bernzott |
| 6,394,557 B2 | 5/2002 | Bradski |
| 7,587,064 B2 | 9/2009 | Owechko |
| 8,447,139 B2 | 5/2013 | Guan |

(Continued)

OTHER PUBLICATIONS

K Mikolajczyk, T Tuytelaars, C Schmid, A Zisserman, J Matas, F Schaffalitzky, T Kadir, and L van Gool entitled "A comparison of affine region detectors" published in the International Journal of Computer Vision, 65(7): 43-72, published in Nov. 2005.

(Continued)

*Primary Examiner* — Reza Aghevli

(57) ABSTRACT

A system and method having a number of technological elements, one of which being a controller, which causes improvements to the controller and creates significantly more than the original default controller functionality. The elements collaborating to cause the controller to operate a camera to record images of a visual content; store the recorded images to a memory, the recorded images being in a digital form as digital images; perform a visual recognition module to identify at least one targeted object within at least one digital image; produce the identification results of the visual recognition module; compare the identification results to the vehicle-reservation information; generate reservation information derived from the comparison outcome of the identification results to the vehicle-reservation information; and operate the display to exhibit the reservation information.

17 Claims, 12 Drawing Sheets

(56) References Cited

U.S. PATENT DOCUMENTS

| | | | |
|---|---|---|---|
| 9,043,349 B1* | 5/2015 | Lin | G06K 9/18 |
| | | | 382/257 |
| 9,055,067 B1* | 6/2015 | Ward, Jr. | H04L 67/10 |
| 9,916,538 B2* | 3/2018 | Zadeh | G06K 9/627 |
| 2009/0232358 A1 | 9/2009 | Cross | |
| 2011/0255743 A1 | 10/2011 | Guan | |
| 2014/0201126 A1* | 7/2014 | Zadeh | G06K 9/627 |
| | | | 706/52 |
| 2014/0257888 A1* | 9/2014 | Yi | G06Q 10/02 |
| | | | 705/5 |
| 2015/0161147 A1* | 6/2015 | Zhao | G06F 17/3079 |
| | | | 707/772 |
| 2015/0348179 A1* | 12/2015 | Kamisawa | G08G 1/205 |
| | | | 705/5 |
| 2016/0054895 A1* | 2/2016 | Lee | G06F 3/04842 |
| | | | 715/716 |
| 2016/0078759 A1* | 3/2016 | Nerayoff | G06Q 20/145 |
| | | | 701/3 |
| 2016/0217157 A1* | 7/2016 | Shih | G06F 17/30256 |
| 2016/0321565 A1* | 11/2016 | Mendoza | G06Q 10/02 |
| 2017/0068909 A1* | 3/2017 | Nguyen | G06K 9/6288 |
| 2017/0103347 A1* | 4/2017 | Alag | H04L 65/1063 |
| 2017/0109661 A1* | 4/2017 | Bergman | G06Q 20/12 |
| 2017/0351977 A1* | 12/2017 | Bijor | G06Q 10/02 |
| 2017/0364835 A1* | 12/2017 | Baker | H04L 63/102 |
| 2018/0126222 A1* | 5/2018 | Duale | A63B 24/0075 |

OTHER PUBLICATIONS

J Matas, O. Chum, U. Martin, and T Pajdla entitled "Robust wide baseline stereo from maximally stable extrernal regions" in the Proceedings of the British Machine Vision Conference, vol. 1, pp. 384-393, published in 2002.

* cited by examiner

SYSTEM AND METHOD TO IDENTIFY A VEHICLE AND GENERATE RESERVATION

BACKGROUND

Vehicle sharing and self-serve vehicle rental services allow consumers to make reservations for station-based use of vehicles, particularly in urban environments. These rental vehicles are often located in reserved parking spaces that are identified with permanently mounted signs or markers. Ideally, a user picks up a vehicle from a reserved parking space and returns the vehicle to that parking space or a similarly marked space nearby. However, as these reserved parking spaces are often found in public parking lots, users are left with little to determine a vehicle's reservation status. This can frustrate the user and prevent them from renting the vehicle in a timely manner. Accordingly, it is desirable to provide a system and method for identifying vehicle reservation availability. It is further desirable to additionally provide an ability to generate a vehicle reservation.

SUMMARY

A method to generate reservation information is presented herein. The method includes the steps of: (a) providing a memory configured to include at least one module of executable instructions, the memory further configured to include a database of reservation information; (b) providing a controller configured to execute the module and communicate with the database; (c) providing a mobile computing device having a display configured to exhibit information; (d) providing a camera on the mobile computing device, the camera configured to record images of a visual content; (e) providing a visual recognition module configured to identify at least one targeted object; (f) recording images, via the camera, of the visual content; (g) storing the images recorded by the camera, via the controller, in a digital form as digital images in the memory; (h) performing, via the controller, the visual recognition module to identify at least one targeted object within at least one digital image; (i) producing, via the controller, the identification results of the visual recognition module; (j) verifying, via the controller, the identification results to the reservation information; and (k) exhibiting, via the display, the reservation information, based upon the outcome of step (j):

The method may further include the steps of: (l) providing a transceiver on the mobile computing device, the transceiver configured to communicate one or more data transmissions; (m) based upon the outcome of step (j), communicating, via the transceiver, the digital images to the controller; and (o) after step (j), receiving, at the transceiver, the reservation information. In such an instance, the memory and controller may be located in a call center.

The module of executable instructions may also be a reservation module configured to assist in completing a vehicle reservation. In such an instance, the method may also further include the steps of: (l) based upon the outcome of step (j), requesting, via the controller, a reservation in compliance with the substance of the reservation information; and (m) based upon step (l), generating, via the controller, a completed reservation from the reservation request. The reservation module may further include a camshift module configured to assist in tracking the location of at least one targeted object. In this instance, the method would include the step of—(n) after step (g), performing, via the controller, the camshift module to assist in tracking the location of at least one targeted object within at least one digital image. The visual recognition module may include: a cascade classifier module configured to utilize a sliding-window search scheme in which windows of various scales can be slid across the substance of at least one digital image; a MSER module configured to detect any regions of interest in the substance of at least one digital image; and an OCR module configured to extract any text from the detected regions of interest within the substance of at least one digital image.

The substance of at least one digital image may be at least a portion of a vehicle-license plate. The targeted object may be a character or symbol positioned on the vehicle-license plate. The reservation information may include: vehicle name; vehicle location; reservation cost; reservation availability facts; and reservation request options.

A system to generate vehicle-reservation information is further presented herein. The system includes a memory, controller, mobile computing device, camera, and visual recognition module. The memory is configured to include a module of executable instructions and to include a database of vehicle-reservation information. The controller is configured to execute the module and communicate with the database. The mobile computing device includes a display configured to exhibit information. The camera is located on the mobile computing device and is configured to record images of a visual content. The visual recognition module is configured to identify at least one targeted object. Moreover, the module enables the controller to: operate the camera to record images of the visual content; store the recorded images to the memory, the recorded images being in a digital form as digital images; perform the visual recognition module to identify at least one targeted object within at least one digital image; produce the identification results of the visual recognition module; verify the identification results to the vehicle-reservation information; and operate the display to exhibit the reservation information when the identification results have been verified in light of the vehicle-reservation information.

DESCRIPTION OF THE DRAWINGS

The disclosed examples will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
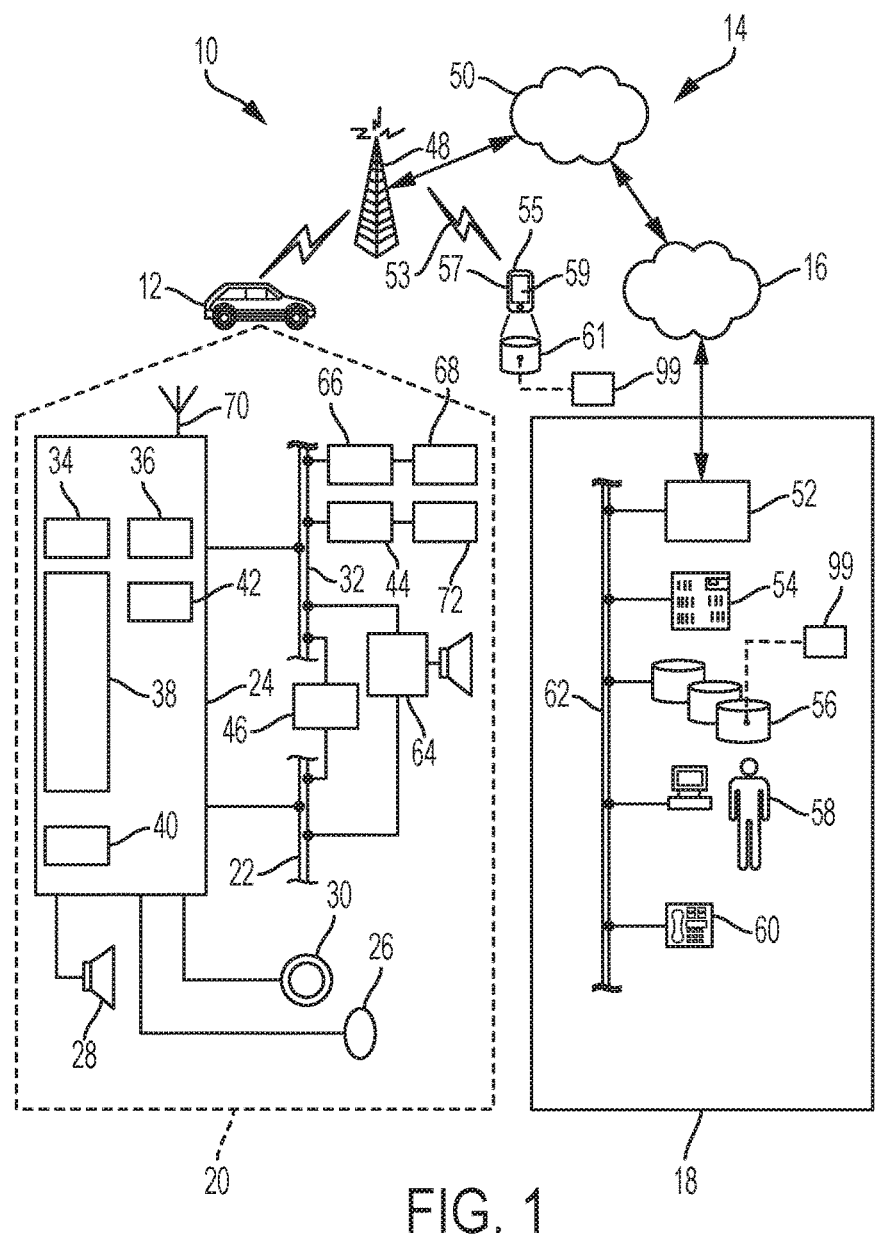
FIG. 1 is a diagram illustrating an exemplary embodiment of a communication system according to an aspect of the system and method presented herein.

With reference to FIG. 1, there is shown a non-limiting example of a communication system 10 that may be used together with examples of the apparatus/system disclosed herein or to implement examples of the methods disclosed herein. Communication system 10 generally includes a vehicle 12, a wireless carrier system 14, a land network 16 and a call center 18. It should be appreciated that the overall architecture, setup and operation, as well as the individual components of the illustrated system are merely exemplary and that differently configured communication systems may also be utilized to implement the examples of the method disclosed herein. Thus, the following paragraphs, which provide a brief overview of the illustrated communication system 10, are not intended to be limiting.

Vehicle 12 may be any type of mobile vehicle such as a motorcycle, car, truck, recreational vehicle (RV), boat, plane, etc., and is equipped with suitable hardware and software that enables it to communicate over communication system 10. Some of the vehicle hardware 20 is shown generally in FIG. 1 including a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the call center 18, and generally includes an electronic processing device 38, one or more types of electronic memory 40, a cellular chipset/component 34, a wireless modem 36, a dual mode antenna 70, and a navigation unit containing a GNSS chipset/component 42. In one example, the wireless modem 36 includes a computer program and/or code segment adapted to be executed within electronic processing device 38.

The telematics unit 24 may provide various services including: turn-by-turn directions and other navigation-related services provided in conjunction with the GNSS chipset/component 42; airbag deployment notification and other emergency or roadside assistance-related services provided in connection with various crash and/or collision sensor interface modules 66 and collision sensors 68 located throughout the vehicle; and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit 24 may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc.

Dual mode antenna 70 services the GNSS chipset/component 42 and the cellular chipset/component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to the telematics unit via the crash and/or collision detection sensor interface 66 regarding the severity of a vehicle collision, such as the angle of impact and the amount of force sustained.

Vehicle sensors 72, connected to various sensor interface modules 44 (VSMs) in the form of electronic hardware components located throughout the vehicle and use the sensed input to perform diagnostic, monitoring, control, reporting and/or other functions. Each of the VSMs 44 is preferably connected by vehicle bus 32 to the other VSMs, as well as to the telematics unit 24, and can be programmed to run vehicle system and subsystem diagnostic tests. As examples, one VSM 44 can be an engine control module (ECM) that controls various aspects of engine operation such as fuel ignition and ignition timing and another VSM 44 can be a powertrain control module that regulates operation of one or more components of the vehicle powertrain. Another VSM 44 can be a body control module (BCM) that governs various electrical components located throughout the vehicle, like the vehicle's power door locks, engine ignition, and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle.

A passive entry passive start (PEPS) module is another type of VSM 44 that can be connected to the vehicle bus 32 and provide passive detection of the absence or presence of a passive physical key or a virtual vehicle key. When the passive physical key or smart phone 57 with virtual vehicle key approaches, the PEPS module 44 can determine if the passive physical key belongs to the vehicle 12 and/or (in some embodiments) determine if the virtual vehicle key is authorized/authentic. If the virtual vehicle key is authentic, the PEPS module 44 can send a command to the BCM permitting access to the vehicle 12. As is appreciated by those skilled in the art, the above-mentioned VSMs are only examples of some of the modules that may be used in vehicle 12, as numerous others are also possible.

Wireless carrier system 14 may be a cellular telephone system or any other suitable wireless system that transmits signals between the vehicle hardware 20 and land network 16. According to an example, wireless carrier system 14 includes one or more cell towers 48

Land network 16 can be a conventional land-based telecommunications network that is connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

One of the networked devices that can communicate with the telematics unit 24 is a mobile computing device 57, such as (but not limited to) a smart phone, personal laptop computer or tablet computer having two-way communication capabilities, a wearable computer such as (but not limited to) a smart watch or glasses, or any suitable combinations thereof. The mobile computing device 57 can include computer processing capability, a transceiver 53 capable of communicating with wireless carrier system 14, a digital camera 55, a visual display 59, and/or a GPS module capable of receiving GPS satellite signals and generating GPS coordinates based on those signals. In some implementations, the display 59 also includes an interactive touch-screen graphical user interface. Digital camera 55 may include the ability to generate digital images which are bitmapped data representations of tangible objects captured and stored by generally known operations of camera 55. Examples of the mobile computing device 57 include the iPhone™ and Apple Watch™ each being manufactured by Apple, Inc. and the Droid™ smart phone that is manufactured by Motorola, Inc. as well as others.

Mobile device 57 may be used inside or outside of a mobile vehicle (such as the vehicle 12 shown in FIG. 1), and may be coupled to the vehicle by wire or wirelessly. The mobile device also may be configured to provide services according to a subscription agreement with a third-party facility or wireless/telephone service provider. It should be appreciated that various service providers may utilize the wireless carrier system 14 and that the service provider of the telematics unit 30 may not necessarily be the same as the service provider of the mobile devices 57.

When using a short-range wireless connection (SRWC) protocol (e.g., Bluetooth Low Energy, Wi-Fi, etc.), mobile computing device 57 and telematics unit 24 may pair with each other (or link to one another) on a case-by-case bases when within a wireless range. This unique pairing may also allow mobile computing device 57 to act as a key fob to operate vehicle 12 through telematics unit 24. In order to pair in this manner, a set of unique encryption keys may be sent to both mobile computing device 57 and telematics unit 24. Call center 20 may moreover participate. For example, the call center 20 may generate the encryption keys as well as a corresponding access token for both telematics unit 24 and mobile computing device 57.

Call center 18 is designed to provide the vehicle hardware 20 with a number of different system backend functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. Database 56 could be designed to hold vehicle-share services records (i.e., vehicle reservation information) such as, but not limited to, vehicle-share services reservation account records, vehicle-share vehicle records, reservation profile records (e.g., a reservation calendar), renter behavioral pattern records, or any other pertinent vehicle-share services information. This backend information being stored and generated could moreover be written in SQL (structured query language). One embodiment of the backend information may be created such that each record is organized through a tabular form (spreadsheet).

For example, the user of mobile computing device 57 may create their own personalized vehicle-share services reservation account ("reservation account") to be stored in database 56. The user may perform tasks to create this account through a variety of devices such as remote computer 18 and mobile computing device 57 or through live advisor 86 at call center 20. The user account may be accessible on server 82 (i.e., to support backend functions). Call center 20 may also access one or more additional remote servers and/or remote databases (e.g., Department of Motor Vehicles databases) to receive information in support of the reservation account.

The user account may include validating data to verify and/or validate that future login attempts are secure (e.g., granting access only to the user). The validating data may include an account username and account password as well as user information (e.g., driver's license number), mobile computing device information such as, for example, the unique mobile device identifier (i.e., serial number). The user account may additionally store a variety of user preferences.

The mobile computing device 57 may receive a software module 99 ("reservation module") which may be associated with their reservation account. For example, the user of the mobile device 57 may visit an online software application store or web-service and download the reservation module 99 therefrom. The mobile computing device 57 may moreover install the frontend piece of the reservation module 99 onto mobile memory 61 of the mobile computing device 57. Reservation module 99 may moreover include one or more graphical user interfaces (GUIs) to be exhibited through display 59, and which include one or more prompts to instruct the user to provide information (e.g., validating data) to support user account creation.

Reservation module 99 assists a vehicle-share system user (mobile computing device user) in reserving at least one vehicle 12 by operatively accessing and communicating with the backend vehicle-share services records in database 56. Reservation module 99 may moreover have access to digital camera 55 as well as include or correspond with a visual recognition module and camshift module, discussed below, to assist a user when identifying a specific vehicle 12 to be reserved.

Although the illustrated example has been described as it would be used in conjunction with a call center 18 that is manned, it will be appreciated that the call center 18 can be any central or remote facility, manned or unmanned, mobile or fixed, to or from which it is desirable to exchange voice and data.

Visual Recognition Module

Figure 2:
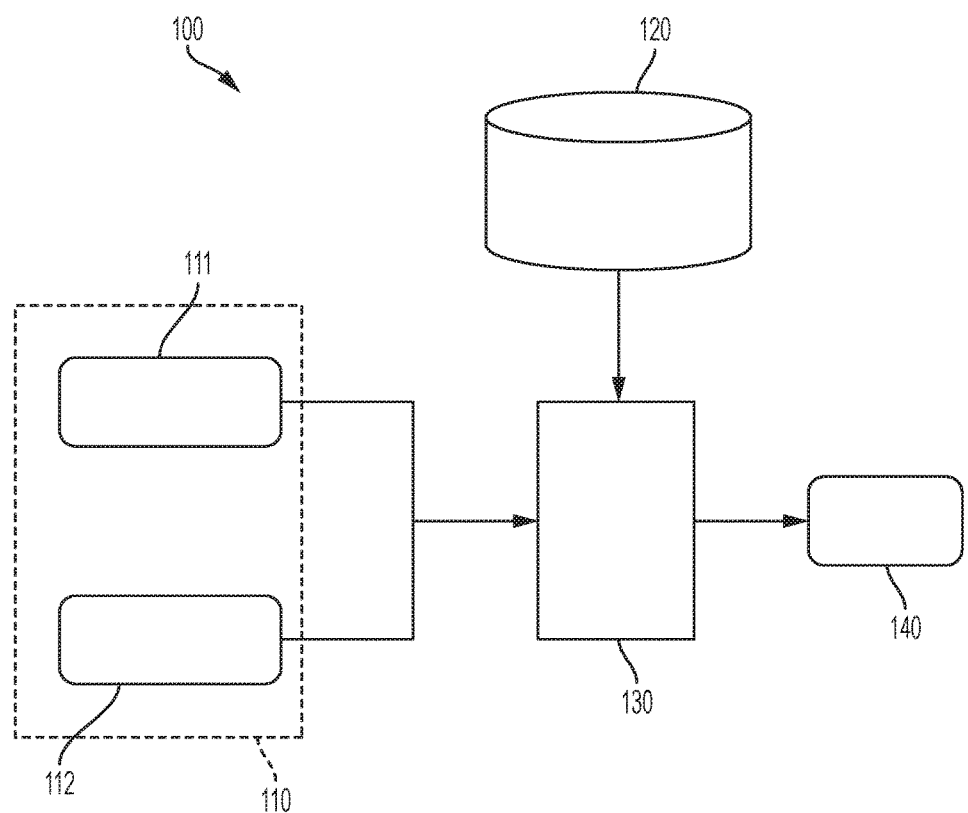
FIG. 2 is a schematic representation of an overview of an exemplary constraint-based visual recognition code segment according to an aspect of the system and method presented herein.

FIG. 2 shows an exemplary schematic representation of an embodiment of at least one code segment to form a system flow for a constraint-based visual recognition module 100 that may correspond with or be integrated into a reservation module 99. Visual recognition module 100 may be performed to identify at least one targeted object (e.g., characters) in visual content (e.g., vehicle license plate), and which may be incorporated into to an embodiment of the system and method herein. As illustrated in FIG. 2, system flow 100 takes an input 110, which, as illustrated, includes visual content 111 and sensor modalities 112 and, together with information retrieved from an image database 120, performs an object identification procedure 130 in order to arrive at identification results 140. System flow 100 will be discussed below in greater detail.

Embodiments of the system and method presented herein utilize sensor modalities such as location system data, 3D accelerometer data, and gyroscope and digital compass information to reduce image search complexity. Location system data can include data from the GPS module, a wide area network (WAN), a wireless network, and the like. For example, if the query image's GPS location is near "50 Centre Street, Concord, New Hampshire", the query image need not be compared with images at significantly different GPS locations. Thus, for example, the query image would not be confused with images of houses in Chicago or Munich, Germany.

Figure 3:
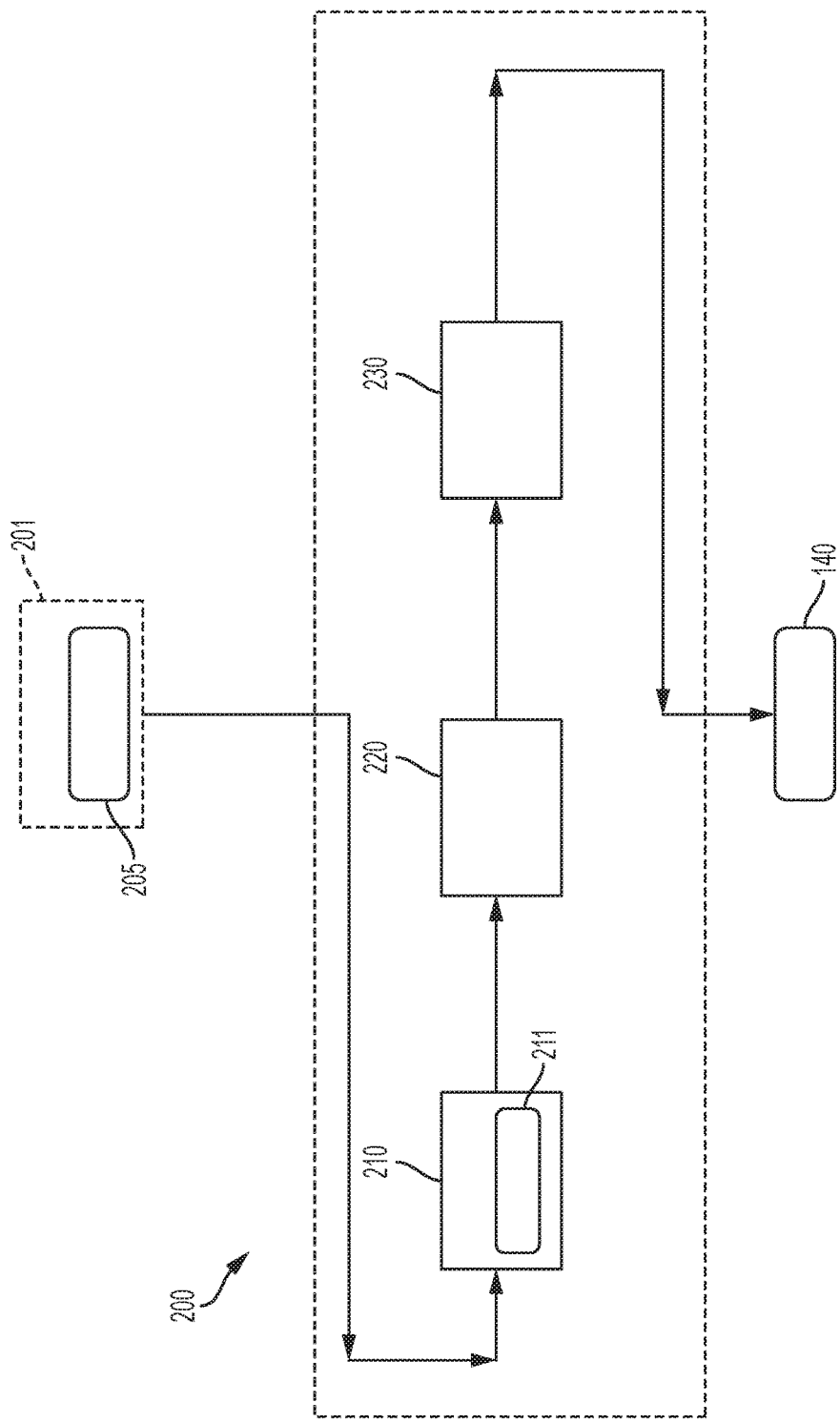
FIGS. 3 and 4 are schematic representations of an exemplary object identification procedure aspect and sensor modalities analysis aspect, respectively, of the visual recognition module according to an aspect of the system and method presented herein.

FIG. 3 is a schematic representation of an exemplary visual recognition algorithm 200 according to an aspect of the object identification procedure (image match procedure) 130. As illustrated, visual recognition module 200 includes, amongst other code segments, a cascade classifier module 210, MSER module 220, and OCR Scan Module 230.

The cascade classifier module 210 includes a multi-level detection framework. In this embodiment, cascaded classifier module 210 receives input 201, typically generated from digital camera 55 and which includes visual content 205 (e.g., a digital image). Cascade classifier module 210 further includes a set of classifiers 211 that have been trained on Haar to identify objects of interest (e.g., license plate characters and symbols) within the incoming visual content 205. For example, the cascade classifier module 210 utilizes a sliding-window search scheme where windows of various scales are slid across the substance of visual content 205. Each classifier thus considers adjacent rectangular image patch at a specific location in visual content 205 and sums up the pixel intensities in each region. The rectangular image patch underneath the sliding window is checked by one or more weak classifiers from the set of Haar classifiers 211 as the sliding window moves across the visual content 205 to distinguish target object from non-target object patches based on the Haar feature for which the classifier has been trained.

Figure 3A:
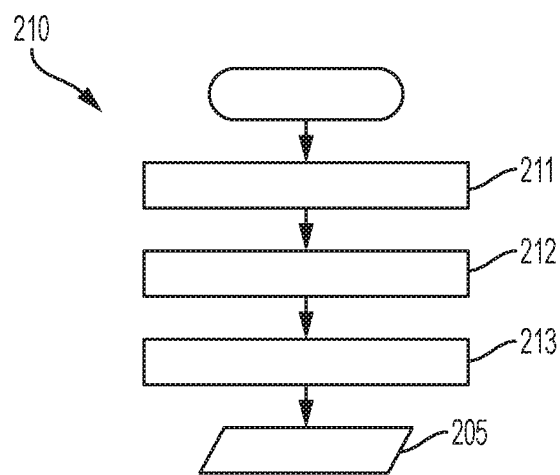
FIG. 3A is a schematic representation of an exemplary cascade classifier module according to an aspect of the system and method presented herein.

With additional reference to FIG. 3A, an embodiment of the cascade classifier module 210 typically works in the following manner, at step 211, the visual content 205 is received by the cascade classification module 210. A sliding window, at step 212, is iteratively applied over the visual content 205. For each sliding window position and size the window, at step 213, is tested by applying one or more weak classifiers from the set of classifiers 211 that have been trained on Haar features, according to the cascade layering architecture which will now be discussed.

Figure 3B:
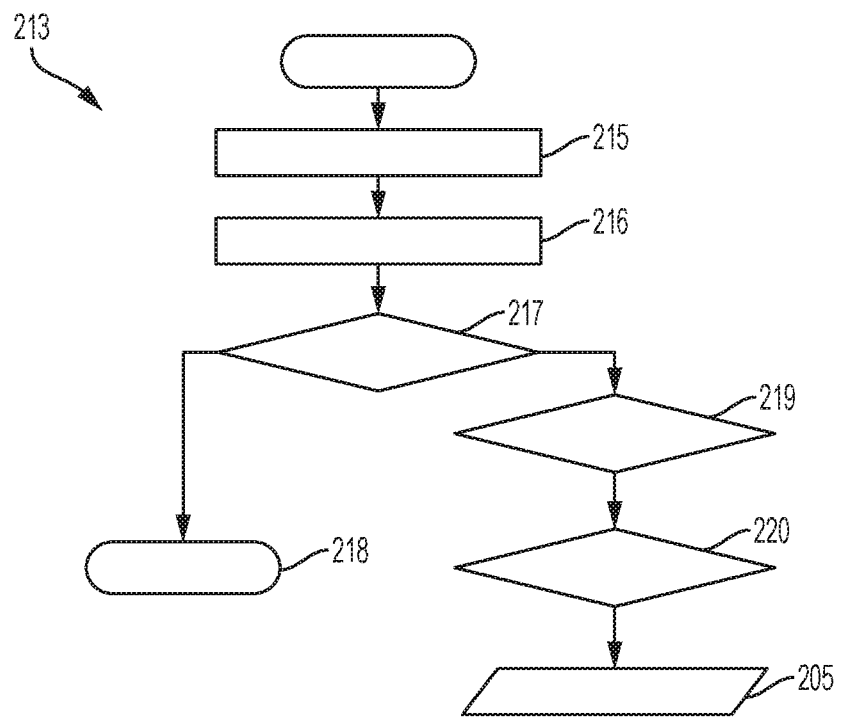
FIG. 3B is a schematic representation of an exemplary aspect of the cascade classifier module of FIG. 3A according to an aspect of the system and method presented herein.

With additional reference to FIG. 3B, for each layer of cascade classifier module 210, the following steps are to be performed. All weak classifiers of that layer, at a first step 215, are applied to the visual content 205. (There may be some AdaBoost architectures where only selected weak classifiers are applied in a decision tree-like manner.) The decisions from all of the weak classifiers as to whether a target object has been detected or not detected are unified into a single decision, at step 216. In step 217, if a target object has not been detected, this process exits and visual recognition module 200 moves to completion 218. This completion 218 may be accompanied by a notification which states visual content 205 could not detect a target object. If, alternatively, a target object has been detected by all layers up to and including the current one, the process determines if there is another layer (step 219). If there is another layer, the process returns to step 215. If there is not another layer, the sliding window position is declared finally to be an instance of the desired object class, and is added to the result set. A non-maximal suppression operation, at step 220, is performed to reduce the result set size by eliminating highly-overlapping window positions. The remaining set of zero or more detected target objects is then determined to be a vehicle license plate. When it is determined that the target objects are a vehicle license plate, for example, visual content 205 is output from module 210. If the target object is not a license plate, the visual content 205 is rejected and visual recognition module 200 moves to completion 218. This completion may be accompanied by a notification which states visual content 205 could not detect a target object. The subject matter of the cascade classifier module 210 is disclosed in U.S. Pat. No. 8,447,139 titled "Object Recognition Using Haar Features and Histograms of Oriented Gradients", issued May 21, 2013, as originally assigned to International Business Machines Corporation, as discussed above, the pertinent portions of which are incorporated herein.

Figure 7:
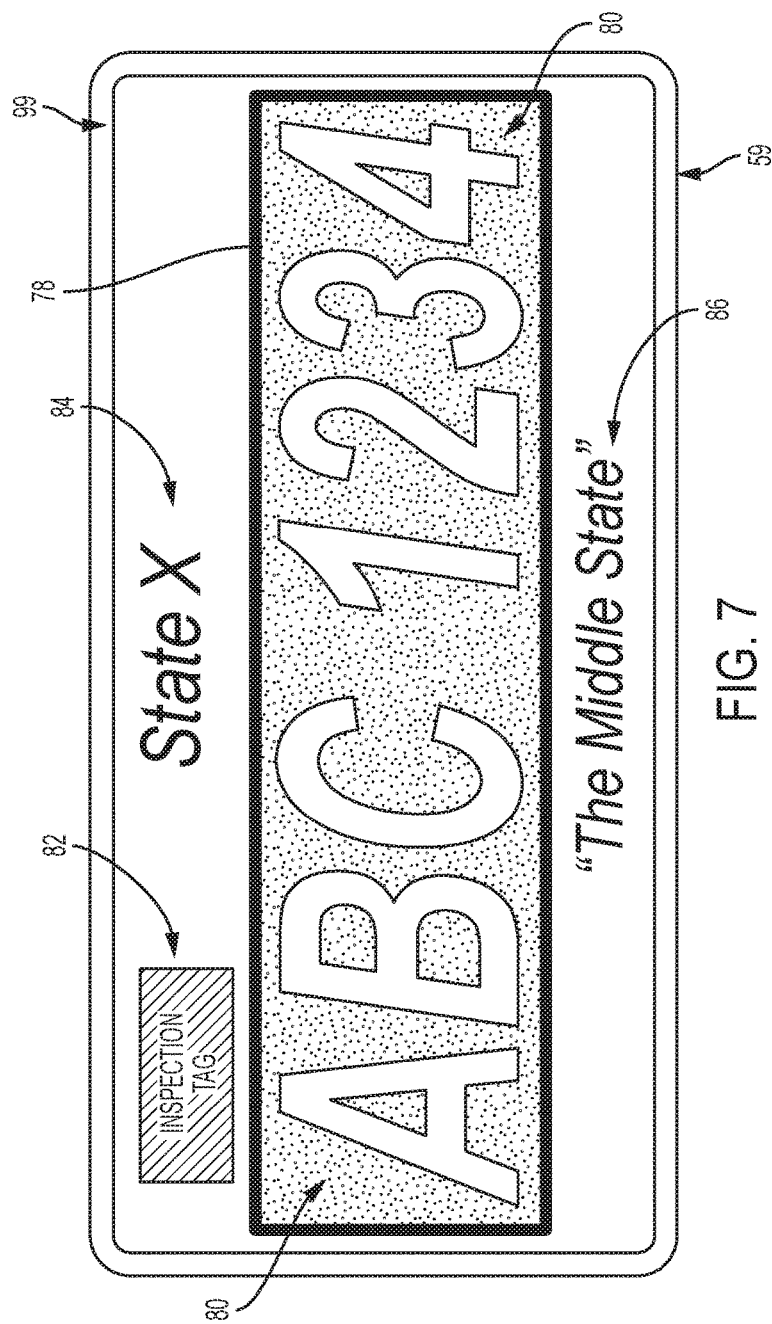
FIG. 7 is another exemplary application of the exemplary reservation module according to an aspect of the system and method presented herein.

In this embodiment, MSER module 220 receives visual content 205 when output from cascade classifier module 210. MSER module 220 is used to detect any regions of interest in the substance of visual content 205, as is generally known. MSERs (maximally stable extremal regions) are essentially an image containing intensity contours of object features obtained by a process of density slicing. MSERs can be regions that are either darker, or brighter than their surroundings, and that are stable across a range of thresholds of the intensity function. For example, an MSER may be a dark colored character or symbol on a license plate having a light background, discussed below (FIG. 7).

The process of generating an MSER generally begins at some base threshold level (black or white) and proceeds by growing a region around a selected region until a stable intensity contour has been achieved. It should be understood that an MSER may have a resolution of 100×100 pixels. The basic principles of MSERs are discussed in articles such as the one by K Mikolajczyk, T Tuytelaars, C Schmid, A Zisserman, J Matas, F Schaffalitzky, T Kadir, and L van Gool entitled "A comparison of affine region detectors" published in the International Journal of Computer Vision, 65(7): 43-72, published in November 2005. Further details of MSERs are to be found in the article by J. Matas, O. Chum, U. Martin, and T Pajdla entitled "Robust wide baseline stereo from maximally stable extremal regions" in the Proceedings of the British Machine Vision Conference, volume 1, pages 384-393, published in 2002.

Figure 3C:
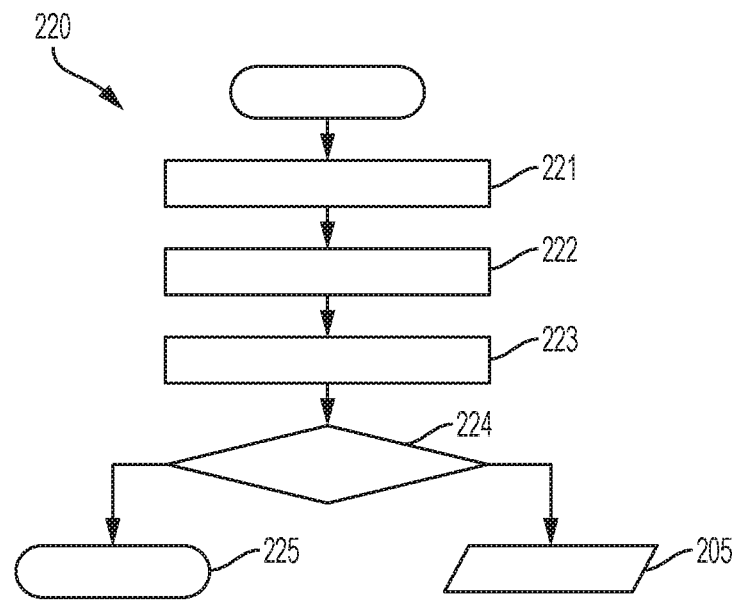
FIG. 3C is a schematic representation of an exemplary Maximially Stable Extremal Regions (MSER) module according to an aspect of the system and method presented herein.
Figure 3D:
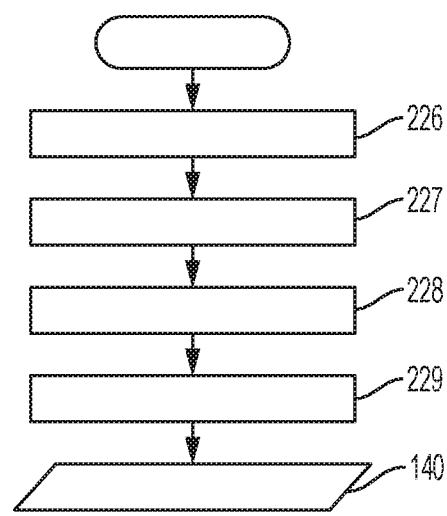
FIG. 3D is a schematic representation of an exemplary Optical Character Recognition (OCR) module according to an aspect of the system and method presented herein.

With additional reference to FIG. 3C, an embodiment of the MSER module 220 typically works in the following manner, in step 221 affine transformations of the visual content 205 objects are performed to allow orientation independent image matching. The principles of affine transformations are well known. An affine transformation is an important class of linear 2-D geometric transformations which maps variables, such as pixel intensity values located at position in an input image, for example, into new variables (in an output image) by applying a linear combination of translation rotation scaling and/or shearing (i.e., non-uniform scaling in some directions) operations. In basic terms, an affine transformation is any transformation that preserves co-linearity (i.e., all points lying on a line initially still lie on a line after transformation) and ratios of distances (e.g., the midpoint of a line segment remains the midpoint after transformation).

In step 222, the MSER images are normalized. Essentially the normalization procedure includes subtracting the mean pixel intensity value of all pixels in the MSER from each pixel and dividing the result by the standard deviation of the pixels in the MSER. In step 223, the MSERs data is converted into a form suitable for comparison with a set of images in database 120. In this instance, skilled artisans will see that such images generally correlate to characters such as those in the Arabic alphabet (A-Z) or symbols such as numeric integers (0-9) and may, in certain embodiments, be of those fonts corresponding to the characters and symbols generally found on license plates issued in the United States or Europe. In step 224, each image in database 120 is compared with each MSER in turn until at least one match is obtained. Once a match is obtained, the MSER is considered a region of interest. When no match can be obtained for a certain MSER, however, this MSER is rejected as not being a region of interested. For example, if an MSER corresponds to a vehicle inspection sticker 82 on the license plate, the MSER would be rejected because it would not match a known character or symbol stored in database 120. (Other rejectable MSERs may be generated, however.)

When it is determined that all MSER matches have been obtained, visual content 205 is output from module 210. If no MSER matches are obtained or a minimal number of matches (e.g., seven) has not been met, visual content 205 is rejected and visual recognition module 200 moves to completion 225. This completion 225 may be accompanied by a notification which states visual content 205 could not detect a sufficient MSER match. The subject matter of the MSER module 220 is disclosed in U.S. Patent Application Publication 2009/0232358 (filed under application Ser. No. 12/382,021) titled "Method and Apparatus for Processing an Image", published Sep. 17, 2009, as discussed above, the pertinent portions of which are incorporated herein.

In this embodiment, OCR Scan Module 230 receives visual content 205 when output from MSER module 220. OCR Scan Module 230 is used to extract the text (text-based retrieval) from the detected regions of interest within the substance of visual content 205, as is generally known. In addition, OCR Scan Module 230 requires no manual intervention to indicate the normal order of reading the text. Skilled artisans will see that such text-based retrieval has the advantages of low computational cost, low storage requirements, and low transmission bandwidth. These text-based inputs help the search system zoom into a reduced search space in real time. Text information is also helpful for differentiating objects with similar appearances.

In step 226, visual content 205 is scanned. In step 227, Optical Character Recognition (OCR) Module 230 isolates and translates the text of each region of interest. In this step, visual content 205 may also be parsed. In step 228, the shapes of individual characters are recognized through a character recognition process. It should be understood that OCR Scan Module 230 is capable of recognizing characters in any number of character fonts. A context analysis process may further be employed to examine the relative sizes and positions of the shapes recognized during the character recognition process to divide the text into words and to resolve ambiguities of shape. In step 229, the recognized characters are formatted and output as the identification results 140. The subject matter of OCR Scan Module 230 is disclosed in U.S. Pat. No. 5,131,053 titled "Optical Character Recognition Method and Apparatus", issued Jul. 14, 1992, as originally assigned to Nuance Communications Inc., as discussed above, the pertinent portions of which are incorporated herein.

Figure 4:
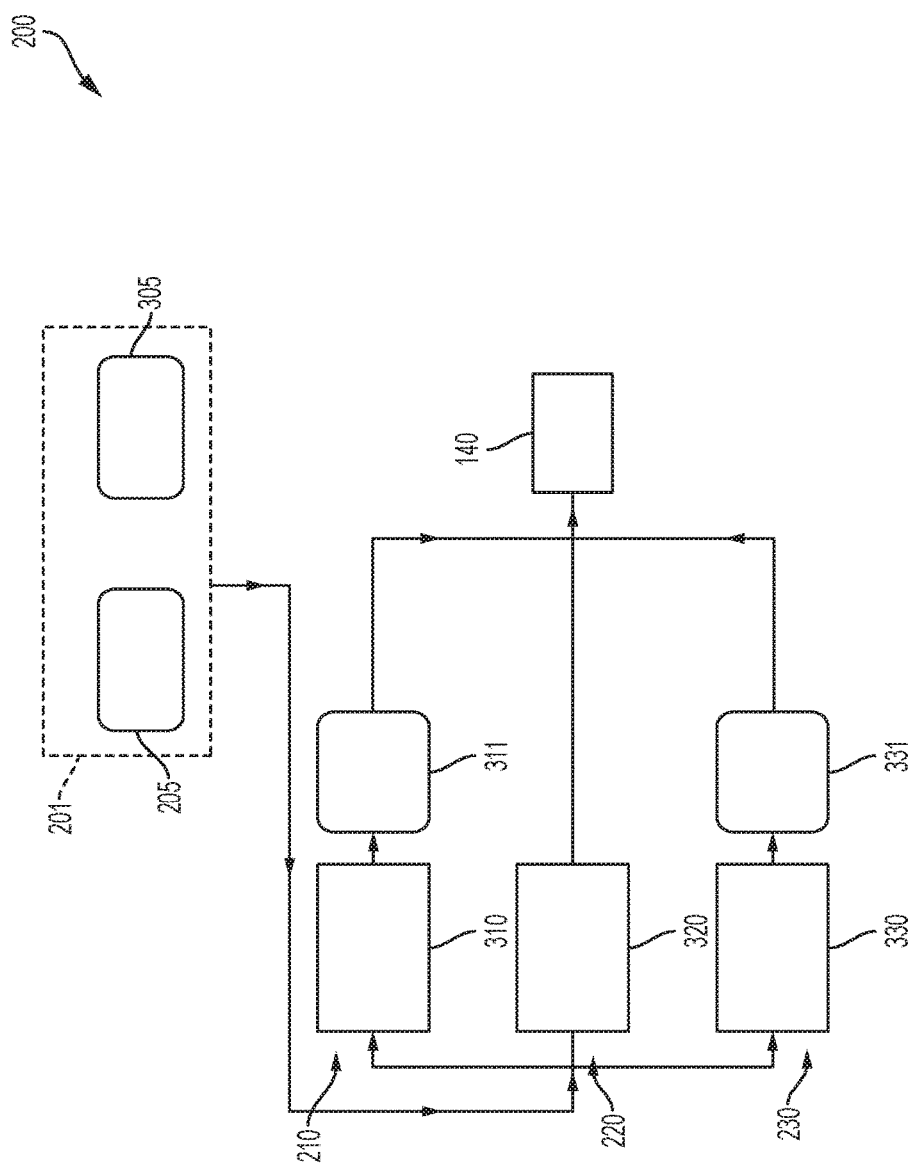

In one embodiment, visual recognition module 200 further incorporates a sensor modalities analysis. This analysis is illustrated in FIG. 4, which is a schematic representation of visual recognition module 200 according to an embodiment of the system and method presented herein. For simplicity, certain elements of visual recognition module 200 appearing in FIG. 2 have been omitted.

As illustrated, input 201 of visual recognition module 200 can further include sensor modalities 305. These may include GPS data 310 or other suitable location sensor data, alignment information 311, time 320, view angle and direction data 330, and the like. Thus, one embodiment combines image content (e.g., visual content 205) with sensor modalities 305 to improve visual recognition accuracy and efficiency. For example, given a GPS location, view angle, direction, etc. two images of the same object taken from different viewing angles and directions can be aligned, using view angle and direction data 330, before keypoints extraction. By doing that, identical objects captured at different rotations 331, view perspectives, etc. can be matched more accurately. As another example, if the capture time 320 shows that one image was taken during the daytime and the other was taken during the evening hours, color comparison will not be used, in order to reduce matching errors that may otherwise arise as a result of the large color changes brought on by day/evening and day/night lighting differences. In addition, OCR accuracy requires that text be located in horizontal position. With the aid of sensor information 330 such as view angle, direction, etc., images may be rotated, if necessary, to a horizontal position in order to increase the accuracy of OCR process 231. As shown in FIG. 3, sensor modalities 305 may occur as an initial step in visual recognition algorithm 200. Sensor modalities 305 may act as an extra layer of refinement in the image identification process that can reduce the size of the image search space. It should be understood that visual recognition algorithms, discussed herein (FIGS. 2-4), may make up part or all of one embodiment of a constraint-based visual recognition module 200. It has been envisioned that other algorithms may be incorporated into the substance of module 100.

Camshift Module

Figure 5:
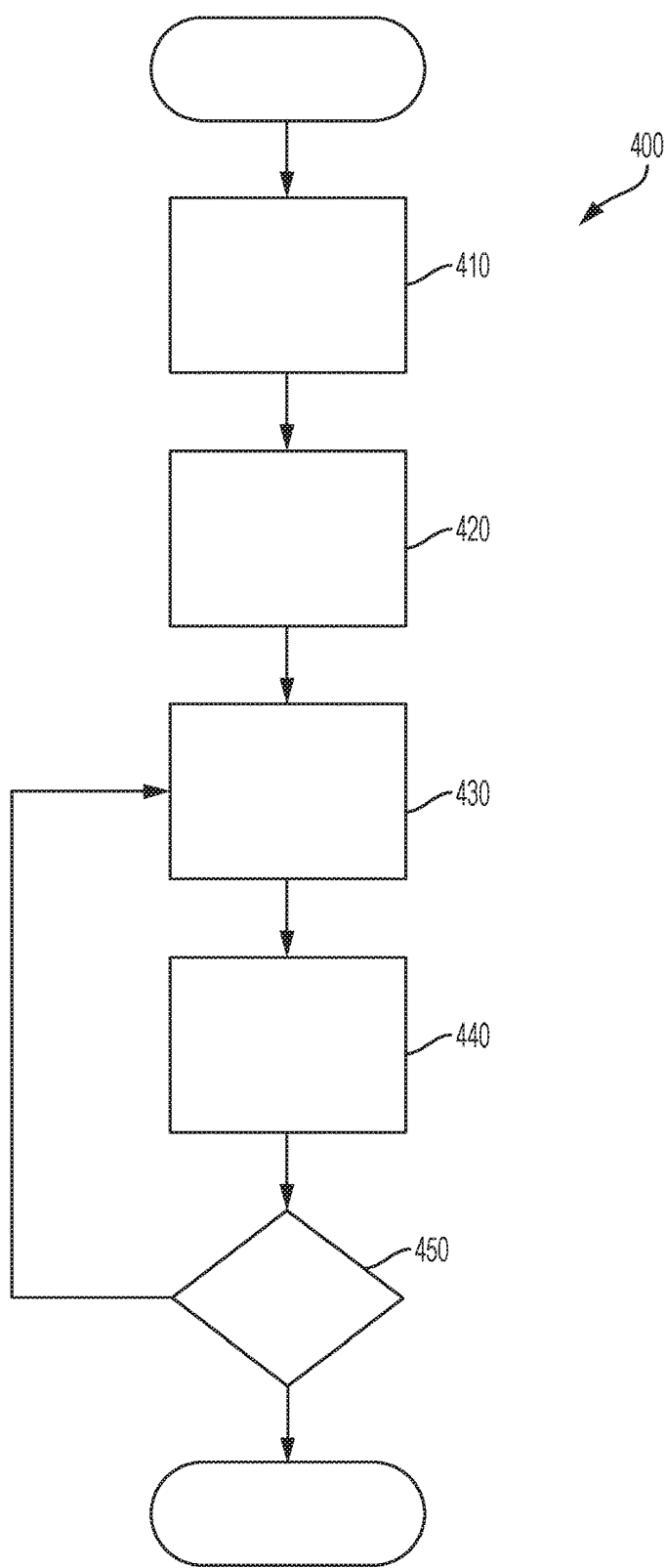
FIG. 5 is a schematic representation of an exemplary camshift module according to an aspect of the system and method presented herein.

As shown in FIG. 5, an embodiment of the reservation module 99 may include a Continuously Adapting Mean Shift (camshift) module 400 to assist the user in tracking the location of the license plate characters and symbols at the frontend GUI of visual recognition algorithm 200. Camshift module 400 further notifies to the user when they have properly centered on the visual content 205 to capture the correct characters and symbols. The subject matter of camshift module 400 is disclosed in U.S. Pat. No. 6,394,557 titled "Method and Apparatus for Tracking an Object Using a Continuously Adapting Mean Shift", issued May 28, 2002, as originally assigned to Intel Corporation, the pertinent portions of which are incorporated herein.

At steps 410 and 420, an initial search window size and initial search location are selected. This may be conducted through digital camera 55 adjustment features on mobile computing device 57 or movement thereof, as are generally known. At step 430, camshift module 400 performs one or more iterations of the mean shift method to move the search window, as is generally known. At step 440, the method adjusts the size of the search window. Step 440 may be conducted through the physical movements of the user of mobile computing device 57 and/or digital camera 55. Next, at step 450, camshift module 400 determines if it has converged upon the center of the probability distribution, as generally known. If the mean shift method has converged, then the method is done. If the CAMSHIFT method has not converged then camshift module 400 returns to step 430 where the mean shift method is performed using the new search location with the new search window size is calculated.

Method

Turning now to and comparing FIGS. 6 through 9, there can be seen an application of a method to generate reservation information through reservation module 99. One or more aspects of this method may be executed through controller 52, for example, implementing the backend functionality of the part of reservation module 99 stored on database 56 or mobile memory 61. Aspects may otherwise be executed through mobile computing device 57, for example, implementing the frontend functionality of the part of reservation module 99 stored on mobile memory 61. It should also be appreciated that aspects of this method may be conducted after a user accesses their reservation account via reservation module 99.

Figure 6:
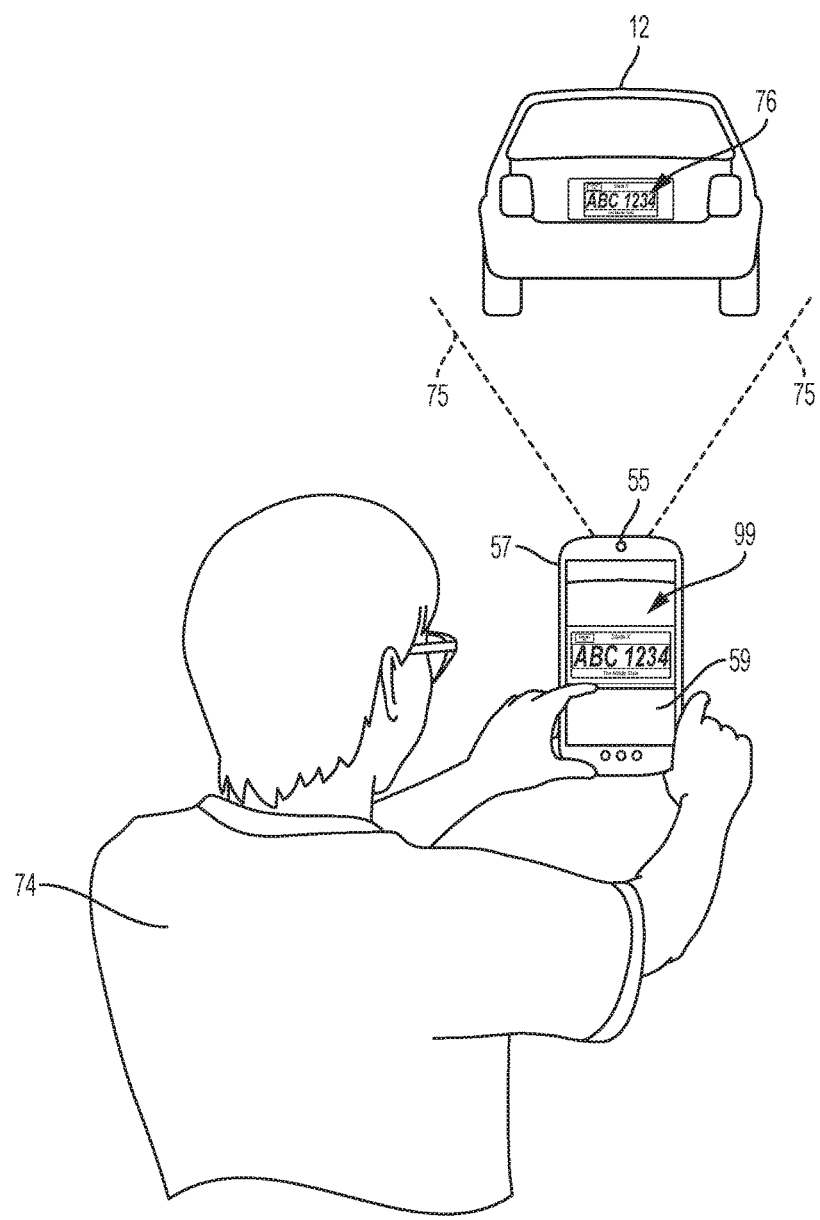
FIG. 6 is an exemplary application of an exemplary reservation module according to an aspect of the system and method presented herein.

With reference to FIG. 6, a user 74 of mobile computing device 57 begins use of reservation module 99 by pointing the field of vision 75 seen through camera lens being in the general direction of a vehicle 12 in which they desire to reserve (i.e., the desired visual content). The user 74 then needs to adjust camera 55 to focus upon the targeted portion of the vehicle 12 which will provide the proper information for desirable results. In this embodiment, the user will focus upon the vehicle-license plate 76 and specifically in such a way to accurately capture the characters and symbols making up the registration number.

With reference to FIG. 7, once in focus, user 74 can operate reservation module 99 to record images of vehicle-license plate 76, generally through the touch-screen graphical user interface feature of display 59. As shown, when reservation module 99 includes a camshift module, a camshift feature 78 may be exhibited to help the user 76 ensure they have properly focused on the targeted characters and symbols forming the registration number 80. The camshift feature 78 is the self-adjusting area centered around the targeted object 80, as illustrated (e.g., a rectangle). By using the size and location of this targeted object 80, the "lock" of the motion-tracker (discussed above) is reinforced on the targeted object of interest.

In the example shown in FIG. 7, the probability distribution of targeted object 80 will be large and any articulated modifications made to the visual content will also be large in absolute number of pixels translated, so the calculation region must be large. Conversely, the probability distribution of non-targeted objects such as, but not limited to, inspection tag 82, licensing state name 84, and state slogan 86 will be small and even if user 74 moves camera 55 quite fast the number of pixels that get translated will be sufficiently small enough and will go undetected by camshift module 400 and thus camshift feature will not become centered around these non-targeted object.

Once captured, one or more critical digital images may then be sent to mobile memory 61 or databases 56, depending on the embodiment, to be stored as one or more digital images being in a digital format (e.g., .jpg). For instance, when reservation module 99 is configured to implement all methodology aspects at mobile computing device 57 (and may have this effort supported through the periodic downloading of the vehicle-share services records from databases 56), the digital images may simply remain in mobile memory 61. However, in those embodiments in which reservation module 99 is configured to implement one or more aspects as backend functionality, the images may be transmitted to databases 56 by transceiver 53. It should be understood that non-critical digital images may be discarded before being downloaded to mobile memory 61 or databases 56 (e.g., those of which have substance that does not adequately reflect targeted object 80).

Upon one or more of the critical digital images being downloaded, reservation module 99 will correspond with visual recognition module 200 for performing the required steps to identify and verify targeted object 80. As discussed above, visual recognition module 220 will produce identification results 140 when each of the cascade classifier module 210, MSER module 220, and OCR Scan Module 230 produces positive results. Otherwise, no identification results 140 will be produced, for example, due to there being insufficient data in the digital images. As such, visual recognition module 220 will perform the required steps upon one or more other digital images or communicate with reservation module 99 to reflect no identification results 140 can be produced. Such a reflection may further be exhibited on display 55.

Reservation module 99 may then take the identification results 140 and store them to mobile memory 61 or databases 56, depending on the embodiment, as discussed above. The identification results 140 may also be stored to either mobile memory 61 or databases 56 independently for access by reservation module 99.

Once properly stored, the identification results 140 can be compared with the vehicle-share services records. Thus, the processed license-plate information can be used to look up the vehicle-share records for a corresponding vehicle 12. These records may then be searched, selected, and accessed from either mobile memory 61 or databases 56. To assist in this effort, the records may each include a tag which corresponds with the identification results 140. For example, if the identification results 140 produce the characters and symbols "ABC 1234" reservation module 99 may search through the records for a tag that is "ABC 1234" (or the equivalent in the respective source code language).

When accessed, reservation module 99 will verify that each of the records match the identification results 140 are logical. For example, reservation module 99 may review all variable information (discussed below) in the accessed record. If any information is determined to be inadequate (e.g., the corresponding reservation profile record being missing) or illogical, for instance, in light of the sensor modalities (e.g., the record shows its respective vehicle to be parked at a remote location), reservation module 99 may notify the user or call center 20. Reservation module 99 may also again correspond with mobile memory 61 or database 56 to search through the records, select, and access another record that may have adequate variable information.

Figure 8:
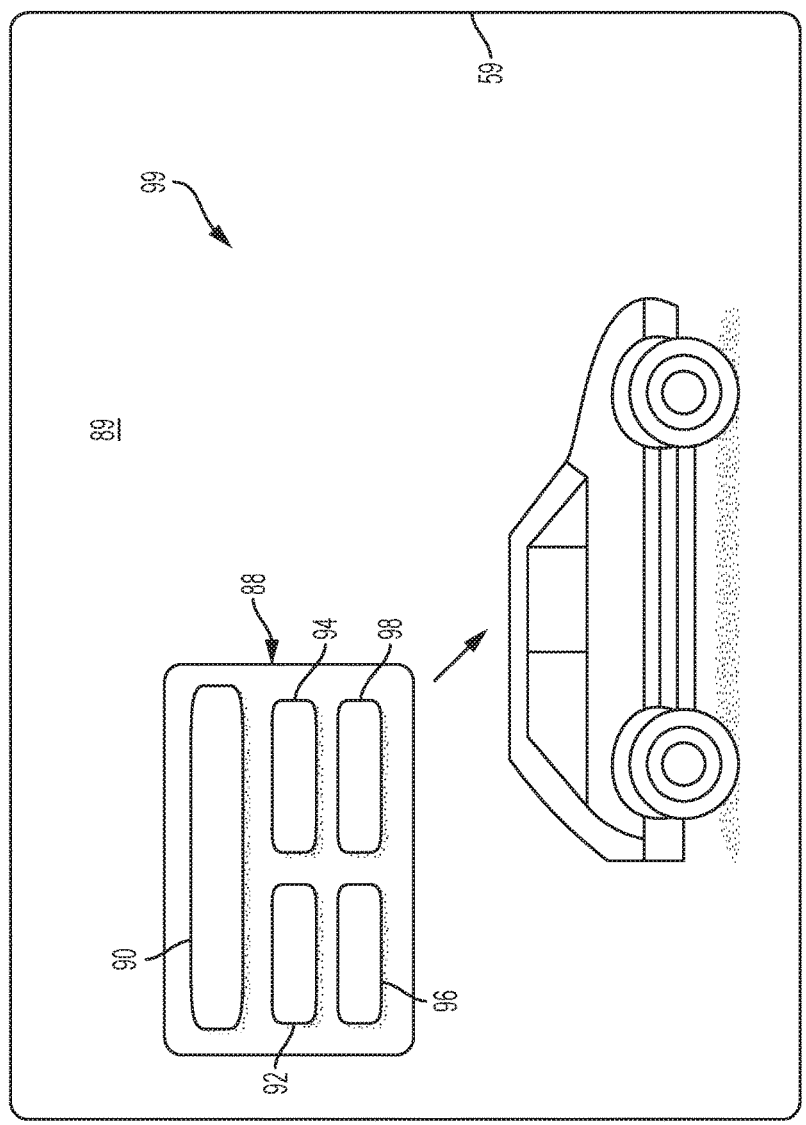
FIG. 8 is another exemplary application of the exemplary reservation module according to an aspect of the system and method presented herein.

Once the variable information is adequately verified, reservation module 99 will generate reservation information 88 that is organized and in a viewable format. As illustrated in FIG. 8, reservation module 99 will in turn exhibit reservation information 88 through, for example, the touch-screen graphical user interface feature of display 59. In those instances when the reservation information 88 is generated in databases 56, after generation is complete, such information may be sent via wireless carrier system 48 and received at transceiver 53.

Reservation module 99 may display reservation information 88 in a pixelated format through an aspect shown as a reservation information screen 89 (via the touch-screen graphical user interface feature of display 59). Reservation information 88 may moreover include variables such as, but not limited to, the vehicle name 90, vehicle location 92, reservation cost 94, reservation availability facts 96, and reservation request options 98. For example, the vehicle name 90 may include generic descriptive information such as, but not limited to, the vehicle year (e.g., "2016") and model (e.g., "Chevrolet Tahoe"), vehicle color (e.g., "White"), vehicle-share system registration number (e.g., "#M28" or "DLT-45XX"), or it may even include a familiar, commercially distinctive, or humorous name for the vehicle (e.g., "The Jenny Lee", "Betsy Matilda", "Nelly", etc.). Vehicle location 92 may include the current location of the vehicle, the location of a designated vehicle parking location, or a parking location in which the vehicle is typically located. Reservation cost 94 may include cost information corresponding to a selected time duration (e.g., "$25 USD for 2 hours", "$55 USD for 8 PM-10 PM, Friday, November 3rd", etc.). Reservation availability facts 96 may include calendar scheduling information regarding the vehicle availability (e.g., "NOT AVAILABLE—10 PM-2 AM, Friday, November $3^{rd}$") or pick up/drop off requirements ("Pick Up at 123 El Segundo Street" and "Drop Off at 345 Main Street"). It should be understood that each piece of the above variable information may come from an individual corresponding vehicle-share services record.

Reservation request options 98 may additionally include selections such as, but not limited to reservation time extensions, fuel information, trip information, live advisor 58 contacting options, and reservation cost negotiation options. It should be understood that the list of the vehicle name 90, vehicle location 92, reservation cost 94, reservation availability facts 96, and reservation request options 98 is not to be considered an exhaustive list and other reservation information may be displayed.

Figure 9:
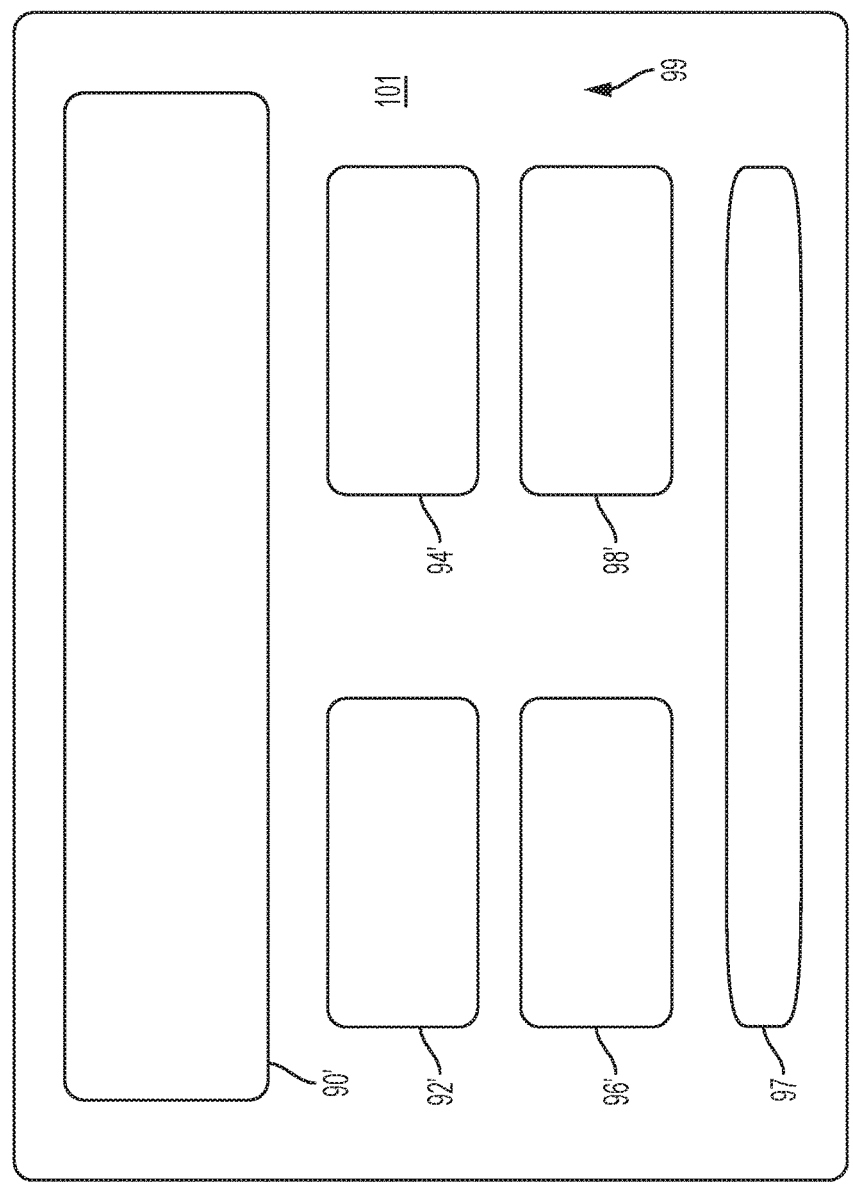
FIG. 9 is another exemplary application of the exemplary reservation module according to an aspect of the system and method presented herein.

As illustrated in FIG. 9, reservation module 99 may be embodied to display reservation information 88, as confirmation information, in a pixelated format through an aspect shown as a reservation confirmation screen 101 (via the touch-screen graphical user interface feature of display 59). Based upon the personal availability of user 74, and in response to the reservation parameters set forth by the variable information in the reservation information 88 (FIG. 8), user 74 may use reservation information screen 101 to request a vehicle reservation. For example, when the schedule of user 74 and the reservation parameters align, the user may desire to reserve the vehicle 12 accordingly. User 74 may generate a reservation request through the use of a virtual confirmation button 97 and thus form a reservation transaction through reservation module 99. As a result, barring any unforeseen consequences, from the reservation request, a completed reservation may be derived by reservation module 99 and the vehicle-share services records may be updated accordingly. As can be seen, reservation confirmation screen 101 may incorporate copies of the reservation information 88 variables (the vehicle name 90', vehicle location 92', reservation cost 94', reservation availability facts 96', and reservation request options 98') as confirmation information, but other configurations of reservation confirmation screen 101 may include more, less, or other non-disclosed variables.

Figure 10:
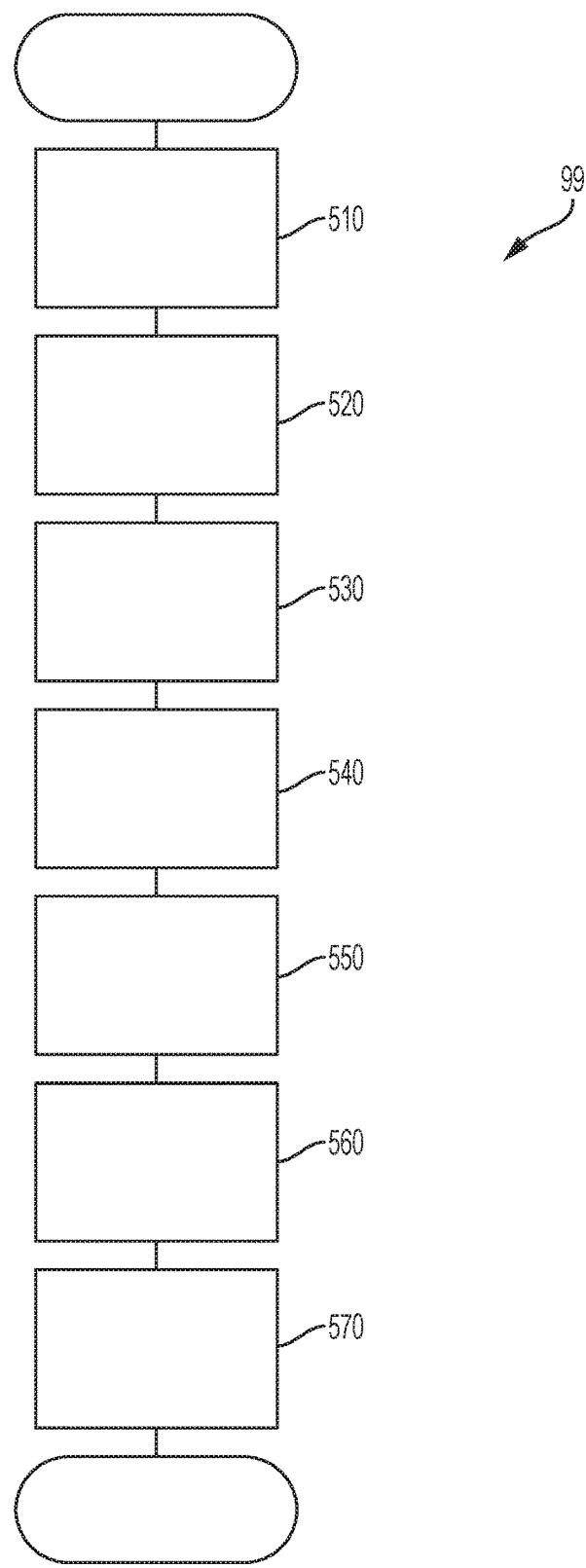
FIG. 10 is an exemplary schematic representation of the reservation module according to an aspect of the system and method presented herein.

Based on the above, there is shown in FIG. 10 an embodiment of reservation module 99 configured to assist in completing a vehicle reservation. As expressed above, reservation module 99 may be installed onto either database 56 or mobile computing device 57 or a portion thereof may be installed onto both database 56 and mobile computing device 57. As a result, aspects of reservation module 99 may be implemented at the backend (i.e., via database 56 and server 54 or mobile computing device 57 and mobile memory 61) and other aspects may be implemented at the frontend (i.e., via mobile computing device 57, mobile memory 61).

In step 510, as discussed above, reservation module 99 operates the camera 55 to record images of a visual content (e.g., vehicle-license plate). In step 520, reservation module 99 stores the recorded images to either mobile memory 61 or database 56 in a digital form (as one or more digital images). It should be understood that embodiments of reservation module 99 may not be required to store the digital images or may store them on a temporary basis.

In step 530, reservation module 99 accesses, collaborates with, and subsequently performs visual recognition module 200 to identify at least one targeted object 80 within one or more stored digital images. In step 540, reservation module 99 causes visual recognition module 200 to produce identification results 140. In step 560, reservation module 99 accesses database 56 and compares the identification results to the vehicle-share services records. In step 570, reservation module 99 generates reservation information from the outcome of the comparison made in step 560. In step 580, reservation module 99 operates display 59 to exhibit the reservation information. Moreover, reservation module 99 may be configured to include an optional step (not shown) to create a reservation in compliance with the substance of the reservation information. In this step, reservation module 99 may further generate a completed reservation from the reservation request, as discussed above, for example, when schedules align. It should be understood that reservation module may one or more of these steps may be completed through the application of transceiver 53.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While various exemplary embodiments have been presented in the foregoing detailed description, it should be appreciated that a vast number of variations exist. It should also be appreciated that the exemplary embodiments are only examples, and are not intended to limit the scope, applicability, or configuration of the disclosure in any way. Rather, the foregoing detailed description will provide those skilled in the art with a convenient road map for implementing the exemplary embodiments. It should be understood that various changes can be made in the function and arrangement of elements without departing from the scope of the disclosure as set forth in the appended claims and the legal equivalents thereof.

The invention claimed is:

1. A method to generate reservation information, the method comprising:
    (a) providing a memory configured to comprise at least one module of executable instructions, the memory further configured to comprise a database of reservation information;
    (b) providing a controller configured to execute the module and communicate with the database;
    (c) providing a mobile computing device comprising a display configured to exhibit information;
    (d) providing a camera on the mobile computing device, the camera configured to record images of at least a portion of a vehicle-license plate;
    (e) providing a visual recognition module configured to identify at least one character or symbol positioned on the vehicle-license plate;
    (f) recording images, via the camera, of the at least a portion of the vehicle-license plate;
    (g) storing the images recorded by the camera, via the controller, in a digital form as digital images in the memory, wherein the substance of the digital images is at least a portion of the vehicle-license plate;
    (h) performing, via the controller, the visual recognition module to identify at least one character or symbol positioned on the vehicle-license plate within at least one digital image;
    (i) producing, via the controller, the identification results of the visual recognition module, wherein the identification results include processed vehicle-license plate information;
    (j) looking up, via the controller, at least one vehicle-share record based, at least in part, on the identification results;
    (k) verifying, via the controller, the at least one vehicle-share record is adequate as well as a logical match for the identification results;
    (l) exhibiting, via the display, reservation information generated from the at least one vehicle-share record, based upon the outcome of step (k); and
    wherein the visual recognition module comprises:
        a cascade classifier module configured to utilize a sliding-window search scheme in which windows of various scales can be slid across the substance of at least one digital image;
        a Maximally Stable External Regions (MSER) module configured to detect any regions of interest in the substance of at least one digital image; and
        an Optical Character Recognition (OCR) module configured to extract any text from the detected regions of interest within the substance of at least one digital image.

2. The method of claim 1, further comprising:
    (m) providing a transceiver on the mobile computing device, the transceiver configured to communicate one or more data transmissions;
    (n) based upon the outcome of step (k), communicating, via the transceiver, the digital images to the controller; and
    (o) after step (n), receiving, at the transceiver, the reservation information.

3. The method of claim 2, wherein the memory and controller are located in a call center.

4. The method of claim 1, wherein the module of executable instructions is a reservation module configured to assist in completing a vehicle reservation.

5. The method of claim 4, further comprising:
(m) based upon the outcome of step (k), requesting, via the controller, a reservation based on the reservation information; and
(n) based upon step (m), generating, via the controller, a completed reservation from the reservation request.

6. The method of claim 4, wherein:
the reservation module further comprising a Continuously Adaptive Mean Shift (camshift) module configured to assist in tracking the location of at least one targeted object; and
the method further comprising:
(m) after step (g), performing, via the controller, the camshift module to assist in tracking the location of at least one targeted object within at least one digital image.

7. The method of claim 1, wherein the reservation information comprising:
vehicle name;
vehicle location;
reservation cost;
reservation availability facts; and
reservation request options.

8. A system to generate vehicle-reservation information, the system comprising:
a memory configured to comprise at least one module of executable instructions, the memory further configured to comprise a database of vehicle-reservation information;
a controller configured to execute the module and communicate with the database;
a mobile computing device comprising a display configured to exhibit information;
a camera on the mobile computing device, the camera configured to record images of at least a portion of a vehicle-license plate;
a visual recognition module configured to identify at least one character or symbol positioned on the vehicle-license plate, wherein the visual recognition module comprises:
a cascade classifier module configured to utilize a sliding-window search scheme in which windows of various scales can be slid across the substance of at least one digital image;
a Maximally Stable External Regions (MSER) module configured to detect any regions of interest in the substance of at least one digital image; and
an Optical Character Recognition (OCR) module configured to extract any text from the detected regions of interest within the substance of at least one digital image;
wherein module enables the controller to:
operate the camera to record images of the at least a portion of the vehicle-license plate;
store the recorded images to the memory, the recorded images being in a digital form as digital images, wherein the substance of the digital images is at least a portion of the vehicle-license plate;
perform the visual recognition module to identify at least one character or symbol positioned on the vehicle-license plate within at least one digital image;
produce the identification results of the visual recognition module, wherein the identification results include processed vehicle-license plate information;
look up at least one vehicle-share record based, at least in part, on the identification results;
verify the at least one vehicle-share record is adequate as well as a logical match for the identification results; and
operate the display to exhibit reservation information generated from the at least one vehicle-share record, when the at least one vehicle-share record is verified to be adequate as well as a logical match for the identification results.

9. The system of claim 8, further comprising:
a transceiver on the mobile computing device, the transceiver configured to communicate one or more data transmissions, the data transmissions comprising the reservation information; and
wherein the module enables the controller to:
receive the reservation information from the transceiver.

10. The system of claim 9, wherein the memory and controller are located in a call center.

11. The system of claim 8, wherein the module is a reservation module configured to assist in completing a vehicle reservation.

12. The system of claim 11, wherein the module enables the controller to:
request a vehicle reservation based on the reservation information; and
generate a completed vehicle reservation from the vehicle reservation request.

13. The system of claim 12, wherein:
the reservation module further comprising a Continuously Adaptive Mean Shift (camshift) module configured to assist in tracking the location of at least one targeted object; and
wherein the reservation module enables the controller to perform the camshift module to assist in tracking the location of at least one targeted object within at least one digital image.

14. A non-transitory and machine-readable medium having stored thereon a module of executable instructions to generate vehicle-reservation information, comprising machine executable code, which when provided a mobile computing device with a camera and display and executed by at least one machine, causes the machine to:
operate the camera to record images of at least a portion of a vehicle-license plate;
store the recorded images to the machine-readable medium, the recorded images being in a digital form as digital images, wherein the substance of the digital images is at least a portion of the vehicle-license plate;
perform a visual recognition module to identify at least one character or symbol positioned on the vehicle-license plate within at least one digital image, wherein the visual recognition module comprises:
a cascade classifier module configured to utilize a sliding-window search scheme in which windows of various scales can be slid across the substance of at least one digital image;
a Maximally Stable External Regions (MSER) module configured to detect any regions of interest in the substance of at least one digital image; and an Optical Character Recognition (OCR) module configured to extract any text from the detected regions of interest within the substance of at least one digital image;

produce the identification results of the visual recognition module, wherein the identification results include processed vehicle-license plate information;

look up at least one vehicle-share record based, at least in part, on the identification results;

compare and verify the at least one vehicle-share record is adequate as well as a logical match for the identification results; and operate the display to exhibit reservation information generated from the at least one vehicle-share record, when the at least one vehicle-share record is positively verified to be adequate as well as a logical match for the identification results.

15. The method of claim 1, wherein the at least one vehicle-share record comprises a tag that corresponds to the identification results and is configured to assist in the looking up of the at least one vehicle-share record.

16. The system of claim 8, wherein the at least one vehicle-share record comprises a tag that corresponds to the identification results and is configured to assist in the looking up of the at least one vehicle-share record.

17. The non-transitory and machine-readable medium of claim 14, wherein the at least one vehicle-share record comprises a tag that corresponds to the identification results and is configured to assist in the looking up of the at least one vehicle-share record.

\* \* \* \* \*